United States Patent
Liu et al.

(10) Patent No.: US 11,817,703 B2
(45) Date of Patent: *Nov. 14, 2023

(54) ELECTRICAL SYSTEM FOR MOBILE POWER GENERATION DEVICE AND MOBILE POWER GENERATION DEVICE

(71) Applicant: YANTAI JEREH PETROLEUM EQUIPMENT & TECHNOLOGIES CO., LTD., Shandong (CN)

(72) Inventors: Yannan Liu, Shandong (CN); Huijuan Cao, Shandong (CN); Ligong Wu, Shandong (CN); Hongly Wang, Shandong (CN); Tao Kou, Shandong (CN); Xu Liu, Shandong (CN); Dekun Tian, Shandong (CN); Libin Zhou, Shandong (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/569,230

(22) Filed: Jan. 5, 2022

(65) Prior Publication Data
US 2022/0255319 A1 Aug. 11, 2022

Related U.S. Application Data

(63) Continuation-in-part of application No. 17/204,615, filed on Mar. 17, 2021, now Pat. No. 11,251,650.

(30) Foreign Application Priority Data

Feb. 9, 2021 (CN) .......................... 202110177632.5
Feb. 9, 2021 (CN) .......................... 202120361104.0

(51) Int. Cl.
*E21B 41/00* (2006.01)
*H02J 3/00* (2006.01)
(Continued)

(52) U.S. Cl.
CPC .............. *H02J 3/0012* (2020.01); *H02B 1/30* (2013.01); *H02J 9/08* (2013.01); *H02P 9/006* (2013.01); *H02P 9/02* (2013.01)

(58) Field of Classification Search
CPC . H02J 3/0012; H02J 9/08; H02P 9/006; H02P 9/02; H02B 1/30
See application file for complete search history.

(56) References Cited

U.S. PATENT DOCUMENTS 6,306,534 B1 10/2001 Faris et al.
6,765,304 B2 7/2004 Baten et al.
(Continued)

FOREIGN PATENT DOCUMENTS

CN 201708445 U 1/2011
CN 201946821 U 8/2011
(Continued)

OTHER PUBLICATIONS

International Search Report and Written Opinion dated Sep. 10, 2022 in corresponding International Patent Application No. PCT/CN2021/104174 (with partial English translation), 15 pages.

*Primary Examiner* — Jared Fureman
*Assistant Examiner* — Esayas G Yeshaw
(74) *Attorney, Agent, or Firm* — XSENSUS LLP (57) ABSTRACT

An electrical system for a mobile power generation device and a mobile power generation device are disclosed. The electrical system includes an electrical cabin and a generator switch cabinet located inside the electrical cabin and including a generator switch device, the generator switch device being configured to connect or disconnect the generator of the mobile power generation device from an external load, the electrical system further includes an auxiliary substation cabinet and an auxiliary substation switch device in the auxiliary substation device cabinet, the auxiliary substation cabinet is located inside the electrical cabin and includes an auxiliary substation device, the auxiliary substation device being configured to convert a first voltage output by the (Continued)

generator into a second voltage; and the auxiliary substation switch device is configured to turn on or turn off the auxiliary substation device, the first voltage being larger than the second voltage.

20 Claims, 4 Drawing Sheets

(51) Int. Cl.
*H02J 9/08* (2006.01)
*H02P 9/00* (2006.01)
*H02B 1/30* (2006.01)
*H02P 9/02* (2006.01)

(56) References Cited

U.S. PATENT DOCUMENTS

| | | |
|---|---|---|
| 9,103,193 B2 | 8/2015 | Coli et al. |
| 9,534,473 B2 | 1/2017 | Morris et al. |
| 9,917,286 B2 | 3/2018 | Sugeno et al. |
| 10,378,326 B2 | 8/2019 | Morris et al. |
| 2006/0055193 A1 | 3/2006 | Colborne |
| 2014/0217689 A1 | 8/2014 | Rumao et al. |
| 2016/0322182 A1 | 11/2016 | Lu |
| 2019/0371089 A1 | 12/2019 | Moumen et al. |
| 2020/0062138 A1* | 2/2020 | Smolenaers ............ B60L 53/24 |
| 2020/0347725 A1 | 11/2020 | Morris et al. |
| 2021/0331559 A1* | 10/2021 | Ducher ................ B60H 1/3232 |
| 2022/0154555 A1* | 5/2022 | El Tawy ............. E21B 41/0085 |

FOREIGN PATENT DOCUMENTS

| | | |
|---|---|---|
| CN | 103280725 A | 9/2013 |
| CN | 207000270 U | 2/2018 |
| CN | 110190647 A | 8/2019 |
| CN | 111412064 A | 7/2020 |
| CN | 112821251 A | 5/2021 |
| EP | 3234321 B1 | 2/2020 |
| JP | 20110794201 A | 4/2011 |
| WO | 2020/104088 A1 | 5/2020 |

* cited by examiner

ELECTRICAL SYSTEM FOR MOBILE POWER GENERATION DEVICE AND MOBILE POWER GENERATION DEVICE

For all purposes, this application is a continuation in part of U.S. Ser. No. 17/204,615 filed on Mar. 17, 2021, which claims priority to the Chinese patent application No. 202110177632.5 filed on Feb. 9, 2021 and the Chinese utility model application No. 202120361104.0 filed on Feb. 9, 2021, for all purposes, the entire disclosure of which is incorporated herein by reference as part of the present application.

TECHNICAL FIELD

Embodiments of the present disclosure relate to an electrical system for a mobile power generation device and a mobile power generation device.

BACKGROUND

With the development of the power industry, there are more and more devices driven by electricity and scenarios of using electricity. Usually, electricity is provided by fixed power plants and power grids; however, because of various reasons, fixed power plants and power grids cannot meet the power demand of users. For example, when the capacity of the power grids is insufficient or the power generation of fixed power plants is insufficient because of overhaul, failure, lack of fuel and other reasons, the power demand may exceed the capacity of power grids or the power generation of fixed power plants, which may lead to power interruption. For example, when natural disasters such as typhoons and earthquakes damage the power grids or power devices, power interruption will occur. For example, in some construction sites and mine scenes without power grids, there will be situations where the power demand cannot be met or the cost of laying power grids is high.

On the other hand, mobile power generation device is a kind of power generation device that can be moved or transported. Therefore, the mobile power generation device can be transported to various scenes with insufficient or no power, thus meeting the power demand of users.

SUMMARY

Embodiments of the present disclosure provide an electrical system for a mobile power generation device and a mobile power generation device. In this electrical system, the first output end of the generator switch cabinet is arranged at the bottom of the electrical cabin and can be electrically connected to the external load through the first hollow portion on the first bottom plate, so that the first output end can be connected to the external load through the connection conductor by using the distance between the electrical cabin on the transport vehicle and the ground. In addition, because the first output end of the generator switch cabinet is arranged at the bottom of the electrical cabin, the space occupied by the first output end in the electrical cabin can be reduced, and then the space or volume of the electrical cabin can be reduced. Therefore, by optimizing the layout of the electrical system, the size of the electrical system can be reduced, and the difficulty of installation, overhaul and maintenance of the electrical system can be reduced, so that the mobile power generation device adopting the electrical system can meet various transportation requirements at the same time under the condition of higher power generation, and the use efficiency of the mobile power generation device can also be improved.

At least one embodiment of the present disclosure provides an electrical system for a mobile power generation device, the mobile power generation device includes a transport vehicle and a generator, and the electrical system includes: an electrical cabin arranged on the transport vehicle; a generator switch cabinet located inside the electrical cabin and including a generator switch device, the generator switch device being configured to connect the generator of the mobile power generation device with an external load or disconnect the generator of the mobile power generation device from the external load; an auxiliary substation cabinet located inside the electrical cabin and comprising an auxiliary substation device, the auxiliary substation device being configured to convert a first voltage output by the generator into a second voltage; and an auxiliary substation switch device in the auxiliary substation device cabinet, the auxiliary substation switch device being configured to turn on or turn off the auxiliary substation device, the first voltage being larger than the second voltage.

For example, in the electrical system provided by an embodiment of the present disclosure, the auxiliary substation device comprises an unit auxiliary transformer.

For example, in the electrical system provided by an embodiment of the present disclosure, a ratio of the first voltage to the second voltage is larger than 20.

For example, in the electrical system provided by an embodiment of the present disclosure, the generator switch cabinet further includes a first output end configured to be electrically connected to the external load through a connection conductor, the first output end includes a connection terminal or a connector, the electrical cabin includes a first bottom plate, the generator switch cabinet is arranged on the first bottom plate, and the first bottom plate includes a first hollow portion, and an orthographic projection of the generator switch cabinet on the first bottom plate is at least partially overlapped with the first hollow portion.

For example, in the electrical system provided by an embodiment of the present disclosure, the mobile power generation device includes a generator cabin, the electrical cabin is arranged adjacent to the generator cabin and shares a first side plate, the generator switch cabinet includes a first access opening, the first side plate includes a first opening arranged corresponding to the first access opening, and an orthographic projection of the first access opening on the first side plate is at least partially overlapped with the first opening, the electrical system further includes a first access partition plate which is detachably installed on the first side plate and shields the first opening.

For example, the electrical system provided by an embodiment of the present disclosure further includes: a neutral point device cabinet located inside the electrical cabin and including a neutral point device, the neutral point device being configured to be connected to a neutral point of the generator, the neutral point device cabinet includes a second access opening, the first side plate includes a second opening arranged corresponding to the second access opening, and an orthographic projection of the second access opening on the first side plate is at least partially overlapped with the second opening, the electrical system further includes a second access partition plate which is detachably installed on the first side plate and shields the second opening.

For example, the electrical system provided by an embodiment of the present disclosure further includes a starting device cabinet located inside the electrical cabin and including a starting device, the starting device being configured to start a prime mover, the first side plate further includes a main body portion between the first opening and the second opening, and the starting device cabinet is arranged between the generator switch cabinet and the neutral point device cabinet and adjacent to the main body portion of the first side plate.

For example, in the electrical system provided by an embodiment of the present disclosure, the starting device comprises a starting motor and a frequency changer, the frequency changer is connected with the starting motor, and configured to control a rotating speed of the starting motor.

For example, in the electrical system provided by an embodiment of the present disclosure, the electrical cabin further includes a second bottom plate at a side of the first bottom plate away from the generator switch cabinet, the second bottom plate includes a second hollow portion, and an orthographic projection of the first hollow portion on the second bottom plate falls into the second hollow portion, the electrical cabin further includes a first cover plate which is movably connected to the second bottom plate and shields the second hollow portion.

For example, in the electrical system provided by an embodiment of the present disclosure, the first output end includes at least one connection terminal, and the first bottom plate includes at least one first hollow portion, the at least one first hollow portion is arranged corresponding to the at least one connection terminal, the second bottom plate includes one second hollow portion, and an orthographic projection of the at least one first hollow portion on the second bottom plate all falls into the second hollow portion.

For example, in the electrical system provided by an embodiment of the present disclosure, a first edge of the first cover plate is hinged with a second edge of the second hollow portion, and the first cover plate is configured to turn over along the first edge.

For example, in the electrical system provided by an embodiment of the present disclosure, the second bottom plate includes a central region and an edge portion disposed around the central region, the central region of the second bottom plate is spaced from the first bottom plate, and the edge portion of the second bottom plate is fixedly connected to an edge of the first bottom plate.

For example, the electrical system provided by an embodiment of the present disclosure further includes: an auxiliary power distribution cabinet located inside the electrical cabin and including an auxiliary power distribution device, the auxiliary power distribution device being configured to provide power to an auxiliary device, the auxiliary power distribution cabinet further includes a second output end configured to be connected to the auxiliary device, the first bottom plate includes a third hollow portion, and an orthographic projection of the auxiliary power distribution cabinet on the first bottom plate is at least partially overlapped with the third hollow portion.

For example, in the electrical system provided by an embodiment of the present disclosure, the electrical cabin further includes a second bottom plate at a side of the first bottom plate away from the auxiliary power distribution cabinet, the second bottom plate includes a fourth hollow portion, and an orthographic projection of the third hollow portion on the second bottom plate falls into the fourth hollow portion, the electrical cabin further includes a second cover plate which is movably connected to the second bottom plate and shields the fourth hollow portion.

For example, in the electrical system provided by an embodiment of the present disclosure, a third edge of the second cover plate is hinged with a fourth edge of the fourth hollow portion, and the second cover plate is configured to turn over along the third edge.

For example, in the electrical system provided by an embodiment of the present disclosure, the mobile power generation device includes a prime mover, and the electrical system further includes: a generator control protection cabinet located in the electrical cabin and including a generator control protection device, the generator control protection device being configured to control and protect the generator; and a prime mover control protection cabinet located in the electrical cabin and including a prime mover control protection device, the prime mover control protection device being configured to control and protect the prime mover.

For example, in the electrical system provided by an embodiment of the present disclosure, the generator control protection device comprises at least one of an overcurrent protection module, an overvoltage protection module and a stator ground protection module.

At least one embodiment of the present disclosure further provides a mobile power generation device, which includes: a transport vehicle; a generator on the transport vehicle; and any one of the abovementioned electrical system.

For example, the mobile power generation device provided by an embodiment of the present disclosure further includes a generator cabin adjacent to the electrical cabin; a prime mover cabin at a side of the generator cabin away from the electrical cabin; and a prime mover inside the prime mover cabin and configured to convert chemical energy of fuel into mechanical energy, the prime mover is connected to the generator, and the generator is configured to convert mechanical energy output by the prime mover into electrical energy.

For example, the mobile power generation device provided by an embodiment of the present disclosure further includes: an excitation system, connected to the generator and configured to control an output voltage of the generator, the excitation system comprises a permanent magnet machines, an AC exciter and an excitation device, the excitation device control an excitation voltage and an excitation current of the generator by judging a voltage and current signal of the generator.

BRIEF DESCRIPTION OF THE DRAWINGS

In order to more clearly illustrate the technical solution of the embodiments of the present disclosure, the drawings of the embodiments will be briefly described in the following. It is obvious that the described drawings below are only related to some embodiments of the present disclosure without constituting any limitation thereto.

DETAILED DESCRIPTION

In order to make objectives, technical details and advantages of the embodiments of the present disclosure more clearly, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly.

At present, mobile power generation devices can be transported to various scenes with insufficient or no power, thus meeting the power demand of users. However, the transport vehicles of high-power mobile power generation devices are large in size, because of the limitation of the natural conditions of roads or the requirements of road laws and regulations, the transport vehicles with large size may not be able to transport the mobile power generation devices to the areas where users are located smoothly and quickly. Therefore, the size of transport vehicles has become one of the main factors limiting the power generation of mobile power generation devices. By making the layout of each component and system in the mobile power generation device more compact, the size of the transport vehicle can be reduced, thus improving the power generation and meeting the transportation requirements under various conditions.

The inventor(s) of the present application has noticed that, besides the layout of the prime mover, generator and various auxiliary devices, the size and layout of the electrical system of the mobile power generation device can also be optimized, thereby reducing the size of the transport vehicle of the mobile power generation device. However, after the mobile power generation device is transported to the designated scene, the installation, overhaul and maintenance of the electrical system of the mobile power generation device are complicated, thus reducing the use efficiency of the mobile power generation device.

Based on this, embodiments of the present disclosure provide an electrical system for a mobile power generation device and a mobile power generation device. The mobile power generation device includes a transport vehicle and a generator. The electrical system includes: an electrical cabin, which is arranged on a transport vehicle; a generator switch cabinet, which is located in the electrical cabin and includes a generator switch device, the generator switch device is configured to connect the generator of the mobile power generation device with an external load or disconnect the generator of the mobile power generation device from the external load; an auxiliary substation cabinet located inside the electrical cabin and comprising an auxiliary substation device, the auxiliary substation device being configured to convert a first voltage output by the generator into a second voltage; and an auxiliary substation switch device in the auxiliary substation device cabinet, the auxiliary substation switch device being configured to turn on or turn off the auxiliary substation device, the first voltage being larger than the second voltage. Therefore, the auxiliary substation device is configured to supply power to other auxiliary device after converting the first voltage output by the generator into the second voltage, and the auxiliary substation switch device can turn on or turn off the auxiliary substation device. In addition, because the auxiliary substation device and the auxiliary substation switch device are both arranged inside the auxiliary substation cabinet, there is no need to separately arrange an electrical cabinet for placing the auxiliary substation switch, so that the integration of the electrical cabin can be improved and the volume of the electrical cabin can be reduced.

Hereinafter, the electrical system for the mobile power generation device and the mobile power generation device provided by the embodiments of the present disclosure will be described in detail with reference to the accompanying drawings.

Figure 1:
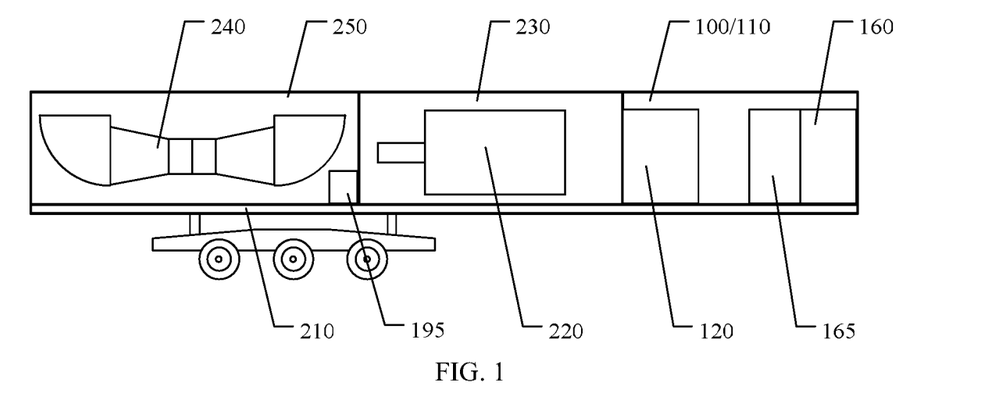
FIG. 1 is a schematic diagram of a mobile power generation device according to an embodiment of the present disclosure.
Figure 2:
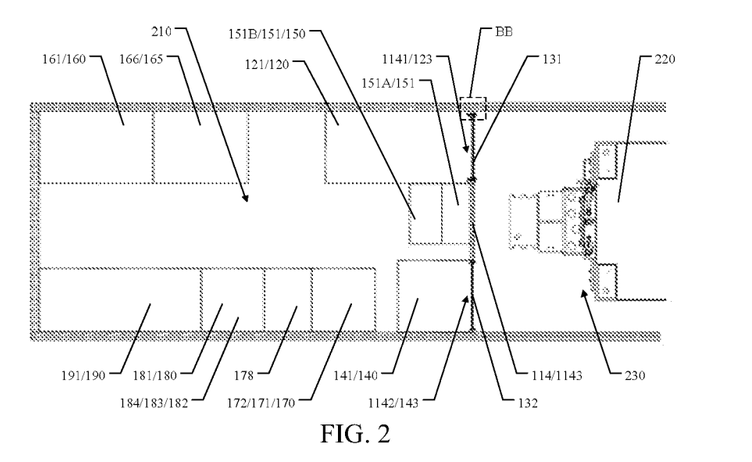
FIG. 2 is a schematic plan view of an electrical system for a mobile power generation device according to an embodiment of the present disclosure.
Figure 3:
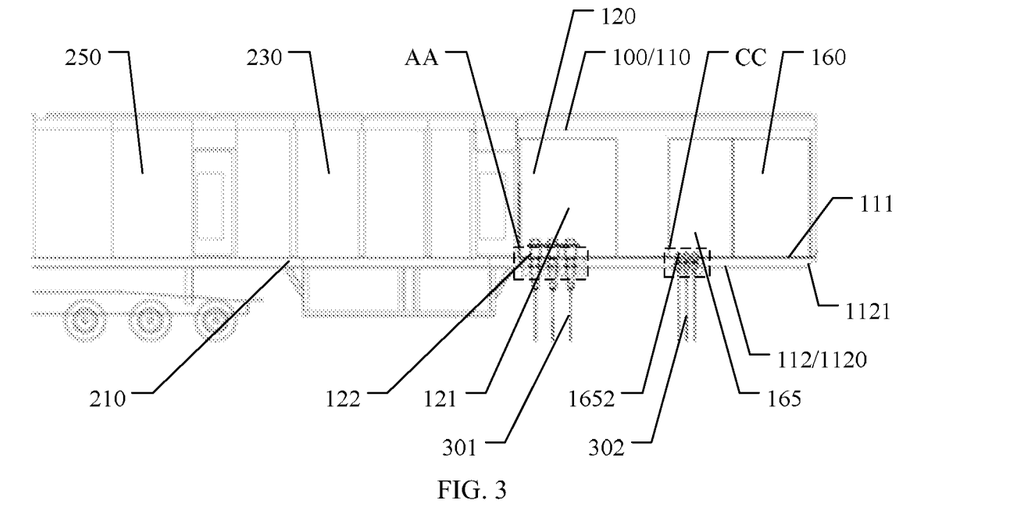
FIG. 3 is a schematic side view of an electrical system for a mobile power generation device according to an embodiment of the present disclosure.
Figure 4A:
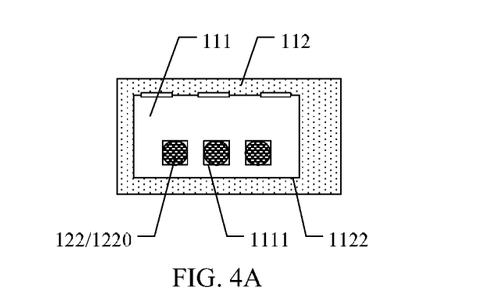
FIG. 4A and FIG. 4B are schematic bottom views of an electrical cabin according to an embodiment of the present disclosure at the position of the dashed frame AA in FIG. 3.
Figure 4B:
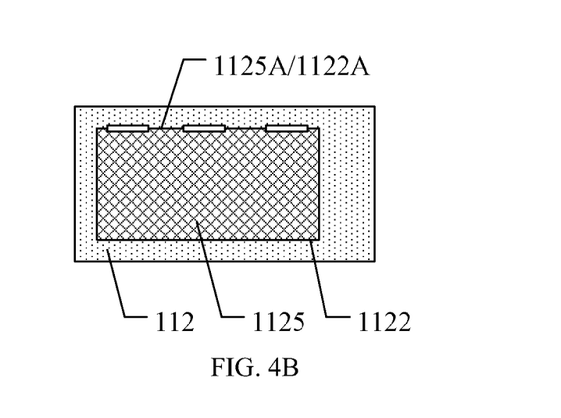

An embodiment of the present disclosure provides an electrical system for a mobile power generation device. FIG. 1 is a schematic diagram of a mobile power generation device according to an embodiment of the present disclosure; FIG. 2 is a schematic plan view of an electrical system for a mobile power generation device according to an embodiment of the present disclosure; FIG. 3 is a schematic side view of an electrical system for a mobile power generation device according to an embodiment of the present disclosure; FIG. 4A and FIG. 4B are schematic bottom views of an electrical cabin according to an embodiment of the present disclosure at the position of the dashed frame AA in FIG. 3.

As illustrated in FIG. 1 and FIG. 2, the mobile power generation device 200 includes a transport vehicle 210 and a generator 220. The generator 220 can be used to generate electricity, and the transport vehicle 210 can be used to carry and transport the generator 220 and the electrical system 100 for the mobile power generation device 200. The electrical system 100 includes an electrical cabin 110 and a generator switch cabinet 120. The electrical cabin 110 is arranged on the transport vehicle 210, and the generator switch cabinet 120 is located in the electrical cabin 110 and includes a generator switch device 121. The generator switch device 121 is used to connect the generator 220 of the mobile power generation device 200 with an external load or disconnect the generator 220 of the mobile power generation device 200 from the external load.

As illustrated in FIG. 2, the electrical system 100 further includes an auxiliary substation cabinet 160 located inside the electrical cabin 110 and including an auxiliary substation device 161, the auxiliary substation device 161 is configured to convert a first voltage output by the generator 220 into a second voltage. The electrical system 100 also includes an auxiliary substation switch device 162 located in the auxiliary substation cabinet 160, and the auxiliary substation switch device 162 is configured to turn on or turn off the auxiliary substation device 161. Therefore, the auxiliary substation device 161 is configured to supply power to other auxiliary device after converting the first voltage output by the generator 220 into the second voltage, and the auxiliary substation switch device 162 can turn on or turn off the auxiliary substation device 161. In addition, because the auxiliary substation device 161 and the auxiliary substation switch device 162 are both arranged inside the auxiliary substation cabinet 160, there is no need to separately arrange an electrical cabinet for placing the auxiliary substation switch, so that the integration of the electrical cabin can be improved and the volume of the electrical cabin can be reduced.

For example, the output of the auxiliary substation device 161 can be connected to the auxiliary power distribution device 166 through wires, so as to provide the auxiliary device with power of the second voltage through the auxiliary power distribution device 166.

In some examples, the auxiliary substation device 161 can include a transformer, and the first voltage is greater than the second voltage. For example, the first voltage can be 10 KV-20 KV, and the second voltage can be 200 V-500 V.

In some examples, the auxiliary substation device 161 includes an unit auxiliary transformer (UAT).

In some examples, a ratio of the first voltage to the second voltage is larger than 20.

As illustrated in FIG. 3, the generator switch cabinet 120 further includes a first output end 122 configured to be electrically connected to the external load through a connection conductor 301. The first output end 122 can be a connection terminal or a connector. The electrical cabin 110 includes a first bottom plate 111, and the generator switch cabinet 120 is arranged on the first bottom plate 111. For example, the generator switch cabinet 120 can be fixed on the first bottom plate 111.

As illustrated in FIG. 3 and FIG. 4A, the first bottom plate 111 includes a first hollow portion 1111, and an orthographic projection of the generator switch cabinet 120 on the first bottom plate 111 is at least partially overlapped with the first hollow portion 1111. That is to say, the generator switch cabinet 120 is arranged at the position where the first hollow portion 1111 is located, and the first output end 122 can be exposed to outside from the first bottom plate 111 through the first hollow portion 1111, or located above the first hollow portion 1111, and the connection conductor passes through the first hollow portion 1111 and is connected to the first output end 122.

In the electrical system for the mobile power generation device according to the embodiment of the present disclosure, because the electrical cabin 110 is arranged on the transport vehicle 210, and the carrying surface or girder of the transport vehicle 210 has a certain distance from the ground, the first output end 122 of the generator switch cabinet 120 is arranged at the bottom of the electrical cabin 110, so that the distance between the electrical cabin 110 on the transport vehicle 210 and the ground can be used to realize the electrical connection between first output end 122 and the external load through the connection conductor 320.

On the one hand, if the first output end of the generator switch cabinet is arranged on the side of the electrical cabin, the first output end will occupy a large space in the electrical cabin considering the factors such as the bending radius of the connection conductor 301 and safety distance. However, in the electrical system 100 according to the embodiment of the present disclosure, by arranging the first output end 122 of the generator switch cabinet 120 at the bottom of the electrical cabin 110, the space occupied by the first output end 122 in the electrical cabin 110 can be reduced, thereby reducing the space or volume of the electrical cabin 110.

On the other hand, if the first output end of the generator switch cabinet is arranged on the side of the electrical cabin, because there is a certain distance (for example, about 1.5 meters) between the carrying surface of the transport vehicle or the bottom of the girder and the ground, it is needed to ensure sufficient safety distance between the output end and the metal part of the transport vehicle 210, so the position of the first output end may be high, and the installer needs climbing tools to connect the connection conductor to the first output end, resulting in low installation efficiency; and the climbing tools need to be transported together, which increases the volume and weight of the mobile power generation device. However, because the distance between the carrying surface or the girder of the transport vehicle and the ground is just convenient for the installer to operate, the electrical system provided by the embodiment of the present disclosure utilizes the distance between the electrical cabin 110 on the transport vehicle 210 and the ground to realize the connection of the first output end 122 and the external load through the connection conductor 301, thereby improving the installation efficiency. Moreover, when overhaul and maintenance are needed, the overhaul efficiency and maintenance efficiency of the electrical system can also be improved.

To sum up, the electrical system can reduce the size of the electrical system and the difficulty of installation, overhaul and maintenance by optimizing the layout of the electrical system, so that the mobile power generation device using the electrical system can meet various transportation requirements at the same time under the condition of high power generation, and the use efficiency of the mobile power generation device can also be improved.

In some examples, the auxiliary substation device 161 and the auxiliary substation switch device 162 are sequentially arranged in the auxiliary substation cabinet 160 in a direction perpendicular to the first bottom plate 111. The auxiliary substation device 161 is arranged below the auxiliary substation switch device 162, that is, the auxiliary substation device 161 is located on a side of the auxiliary substation switch device 162 close to the first bottom plate 111. Therefore, although the height of the auxiliary substation cabinet 160 may increase, the area occupied by the auxiliary substation cabinet 160 remains unchanged, so that the integration of the electrical cabin can be improved and the volume of the electrical cabin can be reduced.

In some examples, as illustrated in FIG. 3, because the generator switch cabinet 120 is arranged on the first bottom plate 111, the first output end 122 is also located at the bottom of the generator switch cabinet 120.

In some examples, as illustrated in FIG. 3, the first output end 122 can include a connector, so that it can be more conveniently connected to an external load. Of course, the first output end 122 can include a connection terminal instead of a connector.

In some examples, as illustrated in FIG. 3, FIG. 4A and FIG. 4B, the electrical cabin 110 also includes a second bottom plate 112, which is located at a side of the first bottom plate 111 away from the generator switch cabinet 120. The second bottom plate 112 includes a second hollow portion 1122, and an orthographic projection of the first hollow portion 1111 on the second bottom plate 112 falls into the second hollow portion 1122. The electrical cabin 110 also includes a first cover plate 1125, which is movably connected to the second bottom plate 112 and shields the second hollow portion 1122. Therefore, when the mobile power generation device is transported, as illustrated in FIG. 4B, the first cover plate 1125 can be in a closed state to shield the second hollow portion 1122, thereby preventing impurities such as moisture and dust from entering the electrical cabin 110 or the space between the first bottom plate 111 and the second bottom plate 112; when the mobile power generation device is transported to the designated position, as illustrated in FIG. 4A, the installer can open or move the first cover plate 1125, and connect the first output end 122 to the connection conductor through the second hollow portion 1122, thus connecting to the external load.

In some examples, as illustrated in FIG. 3, the second bottom plate 112 includes a central region 1120 and an edge portion 1121 disposed around the central region 1120, the central region 1120 of the second bottom plate 112 is spaced from the first bottom plate 111, and the edge portion 1121 of the second bottom plate 112 is fixedly connected to an edge of the first bottom plate 111.

In some examples, as illustrated in FIG. 3 and FIG. 4A, the first output end 122 includes at least one connection terminal 1220, and the first bottom plate 111 includes at least one first hollow portion 1111, which is arranged corresponding to the at least one connection terminal 1220. The second bottom plate 112 includes a second hollow portion 1122, and the orthographic projection of the at least one first hollow portion 1111 on the second bottom plate 112 all falls into the second hollow portion 1122. That is, the size of the second hollow portion 1122 is larger, which is convenient for the installer to install.

For example, as illustrated in FIG. 4A, the planar shape of each connection terminal 1220 can be round or rectangular, the planar shape of the first hollow portion 1111 can be round or rectangular, and the planar shape of the second hollow portion 1122 can be rectangular. Of course, the embodiments of the present disclosure include but are not limited to this, and the planar shapes of the first hollow portion and the second hollow portion can be set according to actual needs.

In some examples, as illustrated in FIG. 4B, a first edge 1125A of the first cover plate 1125 is hinged with a second edge 1122A of the second hollow portion 1122, and the first cover plate 1125 is configured to turn over along the first edge 1125A, which is convenient for the installer to operate.

For example, the above-mentioned hinge can be realized by hinge means such as pivot shaft, hinge chain, etc., and the embodiments of the present disclosure are not specifically limited here. For example, the first cover plate can be connected to the second hollow portion in other forms, and the first cover plate can be moved or folded relative to the second edge, thereby realizing the effect of opening the first cover plate.

In some examples, as illustrated in FIGS. 1 and 2, the mobile power generation device 200 further includes a generator cabin 230, and the electrical cabin 110 is arranged adjacent to the generator cabin 230 and shares the first side plate 114. That is, the electrical cabin 110 and the generator cabin 230 are connected, and only the first side plate 114 is provided between the electrical cabin 110 and the generator cabin 230 for separation.

Figure 5:
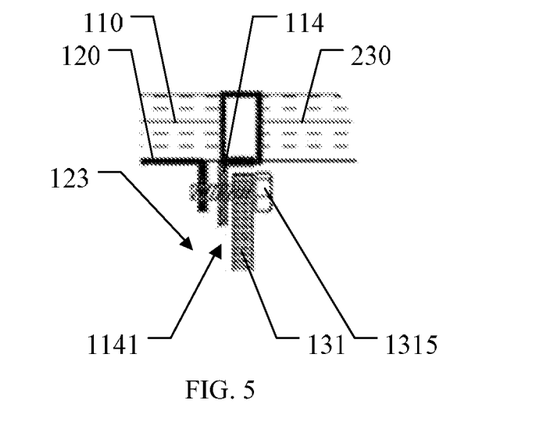
FIG. 5 is an enlarged schematic diagram of the electrical system illustrated in FIG. 2 at the position of the dashed frame BB.

FIG. 5 is an enlarged schematic diagram of the electrical system illustrated in FIG. 2 at the position of the dashed frame BB. As illustrated in FIGS. 2 and 5, the generator switch cabinet 120 includes a first access opening 123; the above first side plate 114 includes a first opening 1141, the first opening 1141 corresponds to the first access opening 123. The orthographic projection of the first access opening 123 on the first side plate 114 is at least partially overlapped with the first opening 1141, and is configured to enable personnel to overhaul the generator switch device 121 in the generator switch cabinet 120 through the first opening 1141 and the first access opening 123. Therefore, the first opening 1141 and the first access opening 123 both have certain areas, and an overlapping area between the first opening 1141 and the first access opening 123 is large (the overlapping area is more than 80% of the first access opening 123), and even the first opening 1141 and the first access opening 123 are completely overlapped, so that people can enter. The electrical system 100 further includes a first access partition plate 131 detachably mounted on the first side plate 114 and shielding the first opening 1141.

Generally, because the device in the generator switch cabinet needs to be overhauled, the generator switch cabinet needs to be provided with an overhaul entrance (its function is similar to that of the first access opening) and an overhaul door located on the overhaul entrance, and an overhaul passage for personnel to enter and exit outside the generator switch cabinet is also required, thus occupying a large space in the electrical cabin.

In the electrical system 100 provided in this example, the orthographic projection of the first access opening 123 on the first side plate 114 is at least partially overlapped with the first opening 1141, and the first access partition plate 131 is detachably mounted on the first side plate 114 and shields the first opening 1141. Therefore, when the mobile power generation device works normally, the first access partition plate 131 can shield the first opening 1141, separate the electrical cabin 110 from the generator cabin 230, and realize the separation and sealing of the electrical cabin 110 and the generator cabin 230. For example, an air conditioner can be installed in the electrical cabin 110 to control the temperature of the electrical cabin 110 between 25° C. and 35° C., thus providing favorable conditions for heat dissipation and safe operation of electrical device in the electrical cabin 110. During the overhaul or installation of the mobile power generation device, people can use the overhaul space of the generator cabin 230 to enter the generator switch cabinet 120 from the generator cabin 230 and overhaul the generator switch device 121 in the generator switch cabinet 120. Therefore, the electrical system 100 provided by this example can further reduce the volume or size of the electrical cabin 110 and make the layout more compact, so that the mobile power generation device using this electrical system can meet various transportation requirements at the same time under the condition of high power generation, and can also improve the use efficiency of the mobile power generation device.

It should be noted that the generator 220 is usually irregular in shape, and considering the requirements of safety, maintenance, wiring, air intake, ventilation, etc., the volume of the generator cabin 230 itself is much greater than that of the generator 220, so that there is a large maintenance space.

For example, as illustrated in FIG. 5, the first access partition plate 131 can be detachably mounted on the first side plate 114 by a screw 1315 and shield the first opening 1141. Of course, the embodiments of the present disclosure include but are not limited to this, and the first access partition plate can also be detachably installed on the first side plate by other means.

In some examples, as illustrated in FIG. 2, the electrical system can further include a neutral point device cabinet 140 located inside the electrical cabin 110 and including a neutral point device 141, the neutral point device 141 is configured to be connected to a neutral point of the generator 220. The neutral point device cabinet 140 includes a second access opening 143, the first side plate 114 includes a second opening 1142 arranged corresponding to the second access opening 143, and the orthographic projection of the second access opening 143 on the first side plate 114 is at least partially overlapped with the second opening 1142. Similarly, the second opening 1142 and the second access opening 143 are also configured so that people can overhaul the neutral point device 141 in the neutral point device cabinet 140 through the second opening 1142 and the second access opening 143. Therefore, the second opening 1142 and the second access opening 143 have a certain area, and the overlapping area between the second opening 1142 and the second access opening 143 is large (the overlapping area is more than 80% of the second access opening 143), and even the second opening 1142 and the second access opening 143 are completely overlapped, so that people can enter. The electrical system 100 further includes a second access partition plate 132 detachably mounted on the first side plate 114 and shielding the second opening 1142.

In the electrical system 100 provided in this example, the orthographic projection of the second access opening 143 on the first side plate 114 is at least partially overlapped with the second opening 1142, and the second access partition plate 132 is detachably mounted on the first side plate 114 and shields the second opening 1142. Therefore, when the mobile power generation device works normally, the second access partition plate 132 can shield the second opening 1142, separate the electrical cabin 110 from the generator cabin 230, and realize the separation and sealing of the electrical cabin 110 and the generator cabin 230. During the overhaul or installation of the mobile power generation device, people can use the overhaul space of the generator cabin 230 to enter the neutral point device cabinet 140 from the generator cabin 230 and overhaul the neutral point device 141 in the neutral point device cabinet 140. Therefore, the electrical system 100 provided by this example can further reduce the volume or size of the electrical cabin 110 and make the layout more compact, so that the mobile power generation device using this electrical system can meet various transportation requirements at the same time under the condition of high power generation, and can also improve the use efficiency of the mobile power generation device.

In some examples, as illustrated in FIG. 2, the electrical system 100 further includes a starting device cabinet 150 located inside the electrical cabin 110 and including a starting device 151, the starting device is configured to start a prime mover 240. The first side plate 114 further includes a main body portion 1143 located between the first opening 1141 and the second opening 1142, and the starting device cabinet 150 is arranged between the generator switch cabinet 120 and the neutral device cabinet 140 and adjacent to the main body portion 1143 of the first side plate 114.

In some examples, as illustrated in FIG. 2, the starting device 151 includes a starting motor 151A and a frequency changer 151B, the frequency changer 151B is connected with the starting motor 151A, and configured to control a rotating speed of the starting motor (151A).

Figure 6A:
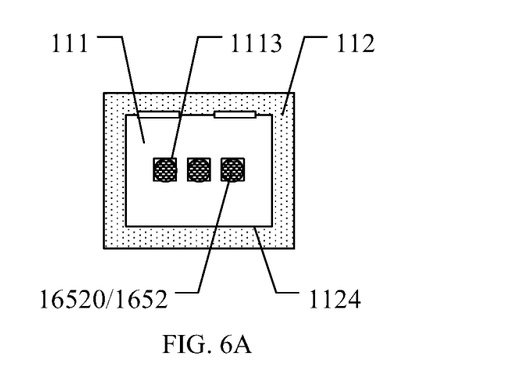
FIG. 6A and FIG. 6B are enlarged schematic views of an electrical cabin according to an embodiment of the present disclosure at the position of the dashed frame CC in FIG. 3.
Figure 6B:
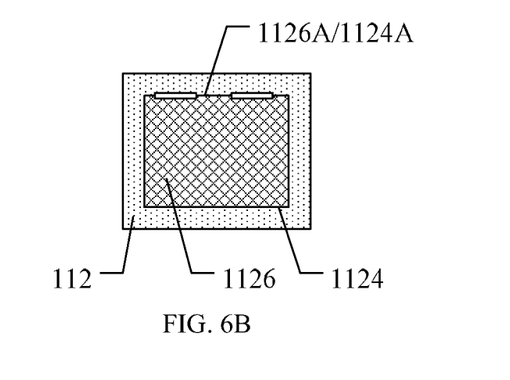

FIG. 6A and FIG. 6B are enlarged schematic views of an electrical cabinet according to an embodiment of the present disclosure at the position of the dashed frame CC in FIG. 3.

In some examples, as illustrated in FIG. 3, FIG. 6A and FIG. 6B, the electrical system 100 further includes an auxiliary power distribution cabinet 165 located inside the electrical cabin 110 and including an auxiliary power distribution device 166, the auxiliary power distribution device 166 is configured to provide power to an auxiliary device. The auxiliary distribution cabinet 165 also includes a second output end 1652 configured to be connected to an auxiliary device, and the second output end 1652 can include a connection terminal or a connector. The first bottom plate 111 includes a third hollow portion 1113, and the orthographic projection of the auxiliary distribution cabinet 165 on the first bottom plate 111 is at least partially overlapped with the third hollow portion 1113. That is, similar to the first output end 122, the second output end 1652 is also located at the bottom of the auxiliary distribution cabinet 165, and can be connected to an auxiliary device through the connection conductor 302.

In the electrical system for the mobile power generation device provided by the embodiment of the present disclosure, because the electrical cabin 110 is arranged on the transport vehicle 210, and the carrying surface or girder of the transport vehicle 210 has a certain distance from the ground, the second output end 1652 of the auxiliary distribution cabinet 165 is arranged at the bottom of the electrical cabin 110, so that the second output end 1652 can be connected to an auxiliary device through the connection conductor 302 by using the distance between the electrical cabin 110 on the transport vehicle 210 and the ground.

On the one hand, if the second output end of the auxiliary power distribution cabinet is arranged on the side of the electrical cabin, the second output end will occupy a large space in the electrical cabin considering the factors such as the bending radius of the connection conductor and the safe distance. However, in the electrical system 100 according to the embodiment of the present disclosure, by arranging the second output end 1652 of the auxiliary power distribution cabinet 165 at the bottom of the electrical cabin 110, the space occupied by the first output end 1652 in the electrical cabin 110 can be reduced, thereby reducing the space or volume of the electrical cabin 110.

On the other hand, if the second output end of the auxiliary power distribution cabinet is arranged on the side of the electrical cabin, because there is a certain distance (for example, about 1.5 meters) between the carrying surface or the girder of the transport vehicle and the ground, the position of the second output end may be high, and the installer needs climbing tools to connect the connection conductor to the second output end, resulting in low installation efficiency; and the climbing tools need to be transported together, which increases the volume and weight of the mobile power generation device. However, because the distance between the carrying surface or the girder of the transport vehicle and the ground is just convenient for the installer to operate, the electrical system provided by the embodiment of the present disclosure utilizes the distance between the electrical cabin 110 on the transport vehicle 210 and the ground to realize that the second output end 1652 is connected to the auxiliary device through the connection conductor 302, thereby improving the installation efficiency. Moreover, when overhaul and maintenance are needed, the overhaul efficiency and maintenance efficiency of the electrical system can also be improved.

In some examples, as illustrated in FIG. 3, FIG. 6A and FIG. 6B, the electrical cabin 110 further includes a second bottom plate 112, which is located at a side of the first bottom plate 111 away from the auxiliary power distribution cabinet 165, and the second bottom plate 112 includes a fourth hollow portion 1124, and the orthographic projection of the third hollow portion 1113 on the second bottom plate 112 falls into the fourth hollow portion 1124. The electrical cabin 110 can further include a second cover plate 1126, which is detachably connected to the second bottom plate 112 and shields the fourth hollow portion 1124. Therefore, when the mobile power generation device is transported, as illustrated in FIG. 6B, the second cover plate 1126 can be in a closed state to shield the fourth hollow portion 1124, thereby preventing impurities such as moisture and dust from entering the electrical cabin 110 or the space between the first bottom plate 111 and the second bottom plate 112; when the mobile power generation device is transported to the designated position, as illustrated in FIG. 6A, the installer can open the second cover plate 1126 and connect the second output end 1652 to the connection conductor through the fourth hollow portion 1124, thus connecting to the auxiliary device.

In some examples, as illustrated in FIG. 6A, similarly, the second output end 1652 includes at least one connection terminal 16520, and the first bottom plate 111 includes a plurality of third hollow portions 1113, which are arranged correspondence to the at least one connection terminal 16520. The second bottom plate 112 includes a fourth hollow portion 1124, and the orthographic projections of the plurality of third hollow portions 1113 on the second bottom plate 112 all fall into the fourth hollow portion 1124. That is, the size of the fourth hollow portion 1124 is large, which is convenient for the installer to install.

For example, as illustrated in FIG. 6A, the planar shape of each connection terminal 16520 can be circular, the planar shape of the third hollow portion 1113 can be circular or rectangular, and the planar shape of the fourth hollow portion 1124 can be rectangular. Of course, the embodiments of the present disclosure include but are not limited thereto, and the planar shapes of the third hollow portion and the fourth hollow portion can be set according to actual needs.

In some examples, as illustrated in FIG. 6B, a third edge 1126A of the second cover plate 1126 is hinged with a fourth edge 1124A of the fourth hollow portion 1124, and the second cover plate 1126 is configured to turn over along the third edge 1126A, thus facilitating the operation of the installer.

For example, the above-mentioned hinge can be realized by hinge means such as pivot shaft, hinge chain, etc., and the embodiments of the present disclosure are not specifically limited here.

For example, the second cover plate can also be connected to the fourth hollow portion in other forms, so that the second cover plate can move or fold relative to the fourth edge, thereby realizing the effect of opening the second cover plate.

In some examples, as illustrated in FIG. 2, the electrical system 100 further includes an uninterruptible power supply cabinet 170, which is located inside the electrical cabin 110 and includes uninterruptible power supply device 171. The electrical system 100 further includes a storage battery 172 located in the uninterruptible power supply cabinet 170. Therefore, the electrical system 100 integrates the uninterruptible power supply device 171 and the storage battery 172 in the same uninterruptible power supply cabinet 170, so that a cabinet for storing the storage battery does not need to be separately arranged, thereby improving the integration degree of the electrical cabin and reducing the volume of the electrical cabin.

For example, the above-mentioned uninterruptible power supply device 171 can be an AC or DC uninterruptible power supply device. The uninterruptible power supply device 171 can provide power for a control device, a protection device and other devices of the generator and the prime mover (for example, a turbine engine) through a power distribution device 178, so as to control and protect the generator and the prime mover when the starting power and the above-mentioned second voltage power disappear.

In some examples, as illustrated in FIG. 1 and FIG. 2, the mobile power generation device 200 includes a prime mover 240. The electrical system 100 also includes a generator control protection cabinet 180 and a prime mover control protection cabinet 190. The generator control protection cabinet 180 is located inside the electrical cabin 110 and includes a generator control protection device 181, the generator control protection device 181 is configured to control and protect the generator 220. The prime mover control protection cabinet 190 is located inside the electrical cabin 110 and includes a prime mover control protection device 191, the prime mover control protection device 191 is configured to control and protect the prime mover 240.

Figure 7:
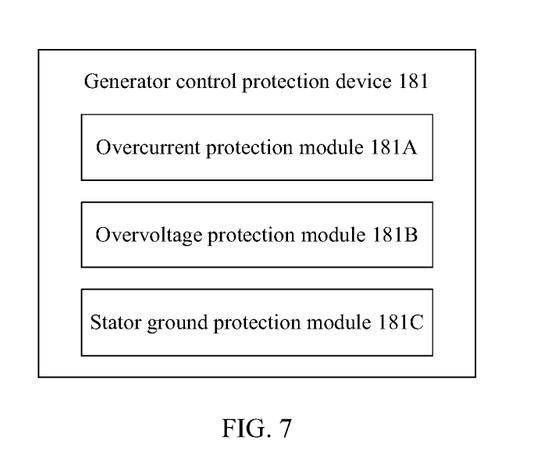
FIG. 7 is a schematic diagram of a generator control protection device according to an embodiment of the present disclosure.

FIG. 7 is a schematic diagram of a generator control protection device according to an embodiment of the present disclosure, as illustrated by FIG. 7, the generator control protection device 181 comprises at least one of an overcurrent protection module 181A, an overvoltage protection module 181B and a stator ground protection module 181C.

In some examples, as illustrated in FIG. 1 and FIG. 2, the electrical system 100 can further include a satellite timing device 182, a generator grid-connected control device 183, and a closed-circuit television device 184. On the one hand, the satellite timing device 182 can be used for timing the generator control and protection device 181 and the prime mover control and protection cabinet 190, which is convenient for operators to analyze the data of the operating conditions and faults of the generator 200. The generator grid-connected control device 183 can be used for running the generator 220 in parallel with other generators or in parallel with the power grid. The closed-circuit television device 184 can be used for remotely monitoring the operating conditions and environmental conditions of the mobile power generation device or device outside the mobile power generation device.

For example, the above satellite timing device 182 can be a GPS timing device or a beidou satellite system timing device. In addition, the above-mentioned satellite timing device 182 can adopt hardwired timing or network timing.

In some examples, as illustrated in FIG. 1 and FIG. 2, the mobile power generation device 200 includes a prime mover cabin 250 in which the prime mover 240 is located. The electrical system 100 further includes a prime mover data acquisition box 195 configured to detect and display the operating parameters of the prime mover 240, and the prime mover data acquisition box 195 is arranged adjacent to the prime mover 240, for example, inside the prime mover cabin 240. Therefore, the prime mover data acquisition module originally arranged in the electrical cabin 110 can be moved to the prime mover cabin 240, thereby reducing the volume of the electrical cabin 110.

An embodiment of the present disclosure further provides a mobile power generation device. FIG. 1 is a schematic diagram of the mobile power generation device according to an embodiment of the present disclosure. As illustrated in FIG. 1, the mobile power generation device 200 includes a transport vehicle 210, a generator 220 and an electrical system 100. The generator 220 is located on the transport vehicle 210, and the electrical system 100 is any one of the above electrical systems. Therefore, by optimizing the layout of the electrical system 100, the size of the electrical system 100 and the difficulty of installation, overhaul and maintenance of the electrical system 100 are reduced, so that the mobile power generation device 200 using the electrical system 100 can meet various transportation requirements at the same time with high power generation, and the use efficiency of the mobile power generation device can also be improved.

In some examples, as illustrated in FIG. 1, the mobile power generation device 200 further includes a generator cabin 230, a prime mover cabin 250 and a prime mover 240. The generator cabin 230 is arranged adjacent to the electrical cabin 110. The prime mover cabin 250 is located at a side of the generator cabin 230 away from the electrical cabin 110. The prime mover 240 is located inside the prime mover cabin 250 and is configured to convert chemical energy of fuel into mechanical energy. The prime mover 240 is connected to the generator 220, and the generator 220 is configured to convert mechanical energy output by the prime mover 240 into electrical energy.

In some examples, the prime mover 240 includes a turbine engine. The turbine engine not only has the advantages of small size, light weight and high power density, but also can use natural gas and well gas as fuel, which has great economic and environmental benefits.

Figure 8:
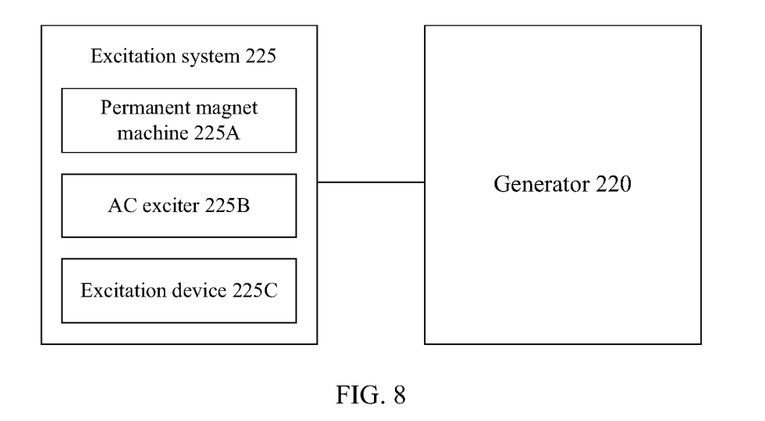
FIG. 8 is schematic diagram of an mobile power generation device according to an embodiment of the present disclosure.

FIG. 8 is schematic diagram of an mobile power generation device according to an embodiment of the present disclosure. As illustrated by FIG. 8, the mobile power generation device 200 further includes an excitation system 225, connected to the generator 220 and configured to control an output voltage of the generator 220; the excitation system 225 includes a permanent magnet machines 225A, an AC exciter 225B and an excitation device 225C, the excitation device 225C control an excitation voltage and an excitation current of the generator 220 by judging a voltage and current signal of the generator 220.

The following points need to be noted:

(1) In the drawings of the embodiments of the present disclosure, only the structures related to the embodiments of the present disclosure are involved, and other structures may refer to the common design(s).

(2) In case of no conflict, features in one embodiment or in different embodiments of the present disclosure can be combined.

The above are merely particular embodiments of the present disclosure but are not limitative to the scope of the present disclosure; any of those skilled familiar with the related arts can easily conceive variations and substitutions in the technical scopes disclosed by the present disclosure, which should be encompassed in protection scopes of the present disclosure. Therefore, the scopes of the present disclosure should be defined by the appended claims.

The invention claimed is:

1. An electrical system for a mobile power generation device, wherein the mobile power generation device comprises a transport vehicle and a generator, and the electrical system comprises:
   an electrical cabin arranged on the transport vehicle;
   a generator switch cabinet located inside the electrical cabin and comprising a generator switcher to connect the generator of the mobile power generation device with an external load or disconnect the generator of the mobile power generation device from the external load;
   an auxiliary substation cabinet located inside the electrical cabin and comprising an auxiliary substation structure to convert a first voltage output by the generator into a second voltage; and
   an auxiliary substation switcher in the auxiliary substation device cabinet to turn on or turn off the auxiliary substation structure, the first voltage being larger than the second voltage.

2. The electrical system according to claim 1, wherein the auxiliary substation structure comprises an unit auxiliary transformer.

3. The electrical system according to claim 1, wherein a ratio of the first voltage to the second voltage is larger than 20.

4. The electrical system according to claim 1, wherein the generator switch cabinet further comprises a first output end configured to be electrically connected to the external load through a connection conductor, the first output end comprises a connection terminal or a connector, the electrical cabin comprises a first bottom plate, the generator switch cabinet is arranged on the first bottom plate, and the first bottom plate comprises a first hollow portion, and an orthographic projection of the generator switch cabinet on the first bottom plate is at least partially overlapped with the first hollow portion.

5. The electrical system according to claim 4, wherein the mobile power generation device comprises a generator cabin, the electrical cabin is arranged adjacent to the generator cabin and shares a first side plate,
   the generator switch cabinet comprises a first access opening, the first side plate comprises a first opening arranged corresponding to the first access opening, and an orthographic projection of the first access opening on the first side plate is at least partially overlapped with the first opening,
   the electrical system further comprises a first access partition plate which is detachably installed on the first side plate and shields the first opening.

6. The electrical system according to claim 5, further comprising:
   a neutral point device cabinet located inside the electrical cabin and comprising a neutral point structure to be connected to a neutral point of the generator,
   wherein the neutral point device cabinet comprises a second access opening, the first side plate comprises a second opening arranged corresponding to the second access opening, and an orthographic projection of the second access opening on the first side plate is at least partially overlapped with the second opening,
   the electrical system further comprises a second access partition plate which is detachably installed on the first side plate and shields the second opening.

7. The electrical system according to claim 6, further comprising:
   a starting device cabinet located inside the electrical cabin and comprising a starter to start a prime mover,
   wherein the first side plate further comprises a main body portion between the first opening and the second opening, and the starting device cabinet is arranged between the generator switch cabinet and the neutral point device cabinet and adjacent to the main body portion of the first side plate.

8. The electrical system according to claim 7, wherein the starter comprises a starting motor and a frequency changer, the frequency changer is connected with the starting motor to control a rotating speed of the starting motor.

9. The electrical system according to claim 1 wherein the electrical cabin further comprises a second bottom plate at a side of the first bottom plate away from the generator switch cabinet, the second bottom plate comprises a second hollow portion, and an orthographic projection of the first hollow portion on the second bottom plate falls into the second hollow portion, the electrical cabin further comprises a first cover plate which is movably connected to the second bottom plate and shields the second hollow portion.

10. The electrical system according to claim 9, wherein the first output end comprises at least one connection terminal, and the first bottom plate comprises at least one first hollow portion, the at least one first hollow portion is arranged corresponding to the at least one connection terminal, the second bottom plate comprises one second hollow portion, and an orthographic projection of the at least one first hollow portion on the second bottom plate all falls into the second hollow portion.

11. The electrical system according to claim 9, wherein a first edge of the first cover plate is hinged with a second edge of the second hollow portion, and the first cover plate is configured to turn over along the first edge.

12. The electrical system according to claim 9, wherein the second bottom plate comprises a central region and an edge portion disposed around the central region, the central region of the second bottom plate is spaced from the first bottom plate, and the edge portion of the second bottom plate is fixedly connected to an edge of the first bottom plate.

13. The electrical system according to claim 1, further comprising:

an auxiliary power distribution cabinet located inside the electrical cabin and comprising an auxiliary power distributor to provide power to an auxiliary structure, wherein the auxiliary power distribution cabinet further comprises a second output end configured to be connected to the auxiliary structure, the first bottom plate comprises a third hollow portion, and an orthographic projection of the auxiliary power distribution cabinet on the first bottom plate is at least partially overlapped with the third hollow portion.

14. The electrical system according to claim 13, wherein the electrical cabin further comprises a second bottom plate at a side of the first bottom plate away from the auxiliary power distribution cabinet, the second bottom plate comprises a fourth hollow portion, and an orthographic projection of the third hollow portion on the second bottom plate falls into the fourth hollow portion, the electrical cabin further comprises a second cover plate which is movably connected to the second bottom plate and shields the fourth hollow portion.

15. The electrical system according to claim 14, wherein a third edge of the second cover plate is hinged with a fourth edge of the fourth hollow portion, and the second cover plate is configured to turn over along the third edge.

16. The electrical system according to claim 1, wherein the mobile power generation device comprises a prime mover, and the electrical system further comprises:

a generator control protection cabinet located in the electrical cabin and comprising a generator control protector to control and protect the generator; and a prime mover control protection cabinet located in the electrical cabin and comprising a prime mover control protector to control and protect the prime mover.

17. The electrical system according to claim 16, wherein the generator control protector comprises at least one of an overcurrent protector, an overvoltage protector and a stator ground protector.

18. A mobile power generation device, comprising:
a transport vehicle;
a generator on the transport vehicle; and
the electrical system according to claim 1.

19. The mobile power generation device according to claim 18, further comprising:

a generator cabin adjacent to the electrical cabin;
a prime mover cabin at a side of the generator cabin away from the electrical cabin; and
a prime mover inside the prime mover cabin and configured to convert chemical energy of fuel into mechanical energy, wherein the prime mover is connected to the generator, and the generator is configured to convert mechanical energy output by the prime mover into electrical energy.

20. The mobile power generation device according to claim 18, further comprising:

an excitation system, connected to the generator and configured to control an output voltage of the generator, wherein the excitation system comprises a permanent magnet machine, an AC exciter and an excitation device, the excitation device control an excitation voltage and an excitation current of the generator by judging a voltage and current signal of the generator.

* * * * *